J. ANDERSON.
DEVICE FOR CLEANING WATER CLOSET AND OTHER BOWLS.
APPLICATION FILED SEPT. 3, 1909.
981,354.
Patented Jan. 10, 1911.
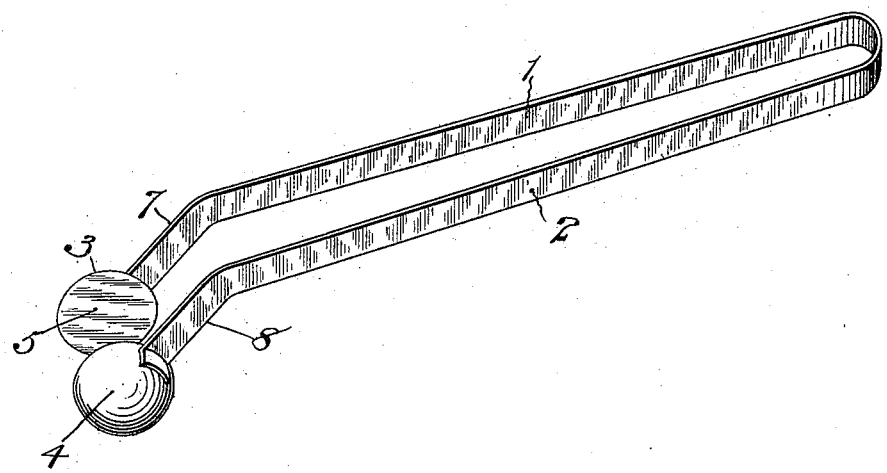
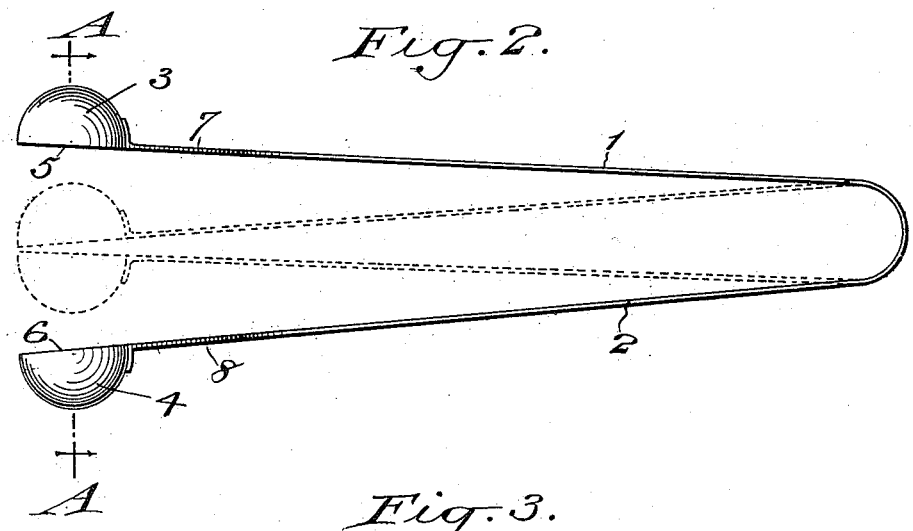
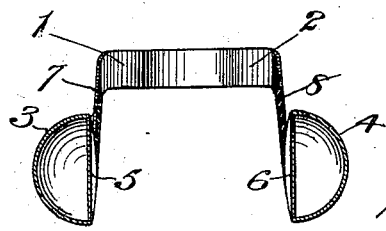
Witnesses:
F. George Barry.
Henry Thieme.
Inventor:
Jane Anderson
by her attorneys
Brown Seward

UNITED STATES PATENT OFFICE.

JANE ANDERSON, OF NEW YORK, N. Y.

DEVICE FOR CLEANING WATER-CLOSET AND OTHER BOWLS.

981,354.  Specification of Letters Patent.  Patented Jan. 10, 1911.

Application filed September 3, 1909. Serial No. 516,093.

*To all whom it may concern:*

Be it known that I, JANE ANDERSON, a citizen of the United States, and resident of the borough of Manhattan, in the city and State of New York, have invented a new and useful Device for Cleaning Water-Closet and other Bowls, of which the following is a specification.

The object of my invention is to provide a device which will be suitable for cleaning water-closet and other bowls, the said device consisting of a holder having a pair of arms provided with heads for grasping the cleansing material between them, the outer portions of the arms being bent at an angle for rendering the device suitable for the purpose indicated.

A further object of my invention is to provide the arms of the holder with rounded heads for preventing the scratching of the bowl and with flat adjacent faces for firmly grasping the cleansing material between them.

A practical embodiment of my invention is represented in the accompanying drawings, in which—

Figure 1 represents the holder in perspective, Fig. 2 is a plan view of the holder, the holder being shown in its normal open position in full lines and in its closed position in dotted lines, and Fig. 3 is a cross section taken in the plane of the line A—A of Fig. 2, looking in the direction of the arrows.

The holder comprises a pair of arms 1 and 2, connected by a spring section 9 tending to hold the arms normally separated as shown in Fig. 1, the outer ends of the arms being provided with rounded back heads 3 and 4 having flat adjacent surfaces 5 and 6.

The rounded back heads serve to prevent the holder from scratching the bowl in connection with which it is used.

The flat adjacent faces serve to give an extended bearing surface for the cleansing material grasped between them.

The outer portions 7 and 8 of the arms 1 and 2 are bent at an angle so as to permit the cleansing material carried by the heads of the holder to be brought into contact with all parts of a bowl of irregular contour such, for instance, as a water-closet bowl.

The device is intended to be used for cleaning water-closet and other bowls without the liability of the hands coming in contact with the bowl.

The cleansing material, such, for instance, as medicated or other chemically treated paper, is grasped between the heads of the holder and while held by the holder, the device is used for cleaning the bowl. After the bowl has been thoroughly cleaned, the device may be released from the cleansing material.

It will thus be seen that a device of this character permits the ready cleaning of water-closet and other bowls in an expeditious and sanitary manner.

What I claim is:—

A device for cleaning water-closet and other bowls comprising a pair of arms connected by a spring section tending to hold the arms normally separated, the free ends of the arms being provided with rounded back heads, the said heads having gripping faces for holding the cleansing material between them, and the outer portions of the arms being bent at an angle to the inner portions of the arms for rendering the device suitable for the purposes indicated.

In testimony, that I claim the foregoing as my invention, I have signed my name in presence of two witnesses, this 28th day of August 1909.

JANE ANDERSON.

Witnesses:
 WM. A. RICHARDSON,
 JOHN GILL, Jr.